March 21, 1967 R. S. HUTTON 3,309,777
PROCESS FOR MAKING UNIFORMLY CONSTITUTED
FINELY DIVIDED PARTICULATE MATERIAL
Filed Aug. 30, 1963
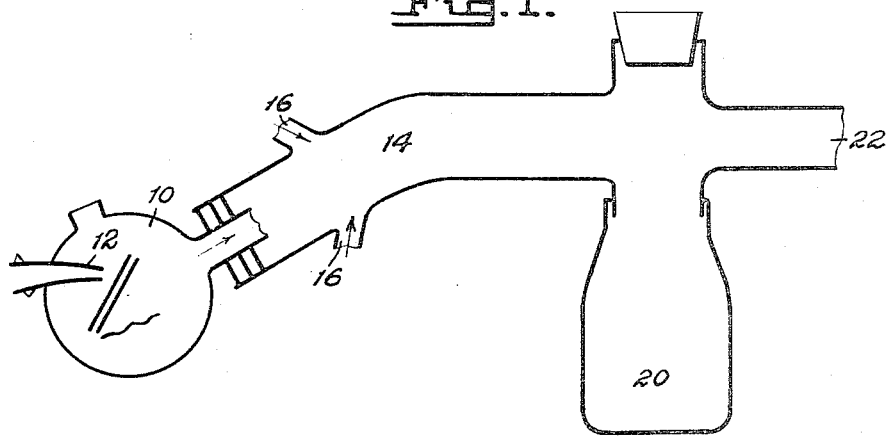
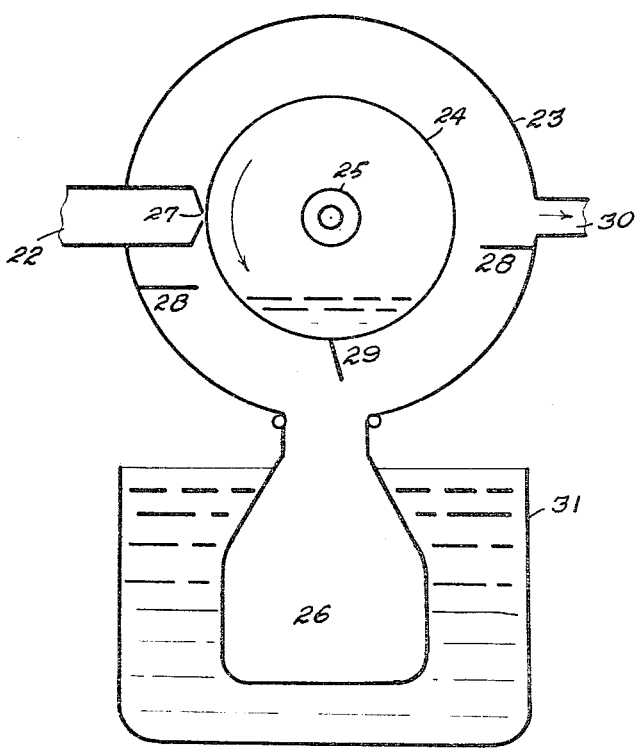
INVENTOR.
Robert S. Hutton
BY Harry M. Saragovitz,
Edward J. Kelly &
Herbert Berl 3,309,777
PROCESS FOR MAKING UNIFORMLY CONSTITUTED FINELY DIVIDED PARTICULATE MATERIAL
Robert S. Hutton, Curunda Heights, Canal Zone, assignor to the United States of America as represented by the Secretary of the Army
Filed Aug. 30, 1963, Ser. No. 305,890
5 Claims. (Cl. 34—5)

The invention described herein may be manufactured and used by or for the Government of the United States of America for governmental purposes without the payment to me of any royalty thereon.

This invention relates to a method of making a solid powder by evaporating a liquid containing dissolved or suspended material. The powder consists of individually constituted, relatively uniformly sized, essentially spherical particles. The method or process involves aerosolizing the liquid, reducing the aerosolized droplets to solid particles through partial drying, and of collecting and freeze drying the resulting particles. The process is especially useful when it is desired to dry and store a material in order that it may be aerosolized from the solid form at a later time. A particular application involves the processing of viruses or bacteria in a way which will enable dissemination of the dry stored product from the solid form into substantially individual units each with the viability of the organism or the activity of the virus substantially unimpaired.

The problem of drying biologicals intended for dispersion from the solid form is a unique problem and one of considerable magnitude. Ordinarily, when dried materials are redispersed to form an aerosol they are restored to the liquid form and are aerosolized as droplets. When it is necessary to disperse dried solids as aerosols however it is required that the structured product formed in conventional freeze drying be reduced to the particulate form by some mechanical means. This step in conventional processing, applied to active or living substances, usually causes large losses in activity or viability. The present invention was devised to eliminate this undesirable feature of processing and to dry such biologicals to yield the smallest possible particle size while at the same time retaining the original viability or activity to a maximum.

Processing is begun by generating an aerosol of the solution or suspension to be processed. Next, the aerosol, containing droplets, is diluted with enough clean dry air or other gas to cause some of the surface liquid of the droplets to evaporate leaving partially dried particles. For the purpose of process description it will be assumed that the liquid is water, however any other substance having suitable boiling and freezing characteristics could be used as well as water. Sufficient time is allowed in this step to permit droplets to come to equilibrium with their new aerosol environment. Subsequently the intact, partially dried particles are drawn, by force of vacuum, temperature differential or electrical charge through an orifice plate or slot and impinge upon a cold surface. When the aerosol carrying the particles is brought in contact with the cold surface most of the condensible gases in the aerosol, including water vapor, freeze out and also become deposited on the cold surface. Thus the particles of the product being processed become deposited upon a continuously forming layer of relatively pure ice. This step is accomplished at temperatures low enough to provide an essentially vapor to solid transformation of the water vapor in the equilibrated aerosol so that there is no appreciable opportunity for the formed particles to become rehydrated. Ideally, each particle in the collected solid is separated from each other particle by a layer of pure water ice a few molecules thick. The particles are next scraped off this surface and allowed to fall into a container maintained at a desired low temperature. The temperature must be low enough to preclude any migration between water and the contained particulate matter. The resulting particles are then freeze-dried under vacuum at which time all free water is removed by sublimation, an essential feature of freeze drying, so as to again prevent any loss or alteration of form of the individual particles. The produce is a powder consisting of minute, approximately spherical, particles.

In the drawings, FIG. 1 shows an aerosol chamber 10 equipped with a nebulizer 12. Mixing chamber 14 has ducts 16, as required for admission of dry air and solid, finely divided adjuvants to the aerosol. Following the mixing chamber there is provided a storage-equilibration chamber 20 from which the aerosol is removed for freeze drying.

FIG. 2 of the drawings shows a collector freezer device having a connection 22 from the aerosol generator unit of FIG. 1. The collector freezer consists of a closed, hollow, cylindrical housing 23 within which a closed, cylindrical drum 24 rotates on a hollow shaft and bearing unit 25 located in one of the ends of the closed cylindrical housing. The hollow shaft opens to the outside and provides the means for introducing liquid coolant into drum 24. Other elements of the collector freezer are collection vessel 26, orifice 27, baffle 28, blade 29 and connection to vacuum 30. In operation the aerosol generated by the unit shown in FIG. 1 is drawn, by vacuum or pressure differential through duct 22 and orifice 27 in such a way as to cause continuous impingement and condensation on drum 24. As drum 24 rotates the collected aerosol is brought into the zone below baffle 28 which is substantially free of currents of moving gases and is scraped from drum 24 by the doctor blade 29. When the collected aerosol is scraped from the drum it falls into the collection vessel 26 where it is held until it is subjected to freeze drying in the final stage of the process. Insulated and refrigerated unit 31 surrounding the collection vessel permits control of temperature of the collected aerosol at some desired level.

The step of forming the aerosol is very important inasmuch as it determines the particle size and composition of the final product. The droplet aerosol of the suspension to be transformed into particulate matter is created in an enclosure containing an atmosphere of selected gases. The relative humidity in the enclosure is controlled to permit the droplets to be reduced to solid particles at the desired rate. Temperature of the gases of the aerosol are controlled to provide the desired amount of drying of the particles. The particles in the aerosol are subjected, as desired, to agitation, by sound or other forms of energy so as to provide the kind of product required for further processing. Very small particles may be given additional energy needed for movement to and impaction upon the cold surface by addition of an appropriate electrical charge. The rate, manner, and time of addition of adjuvant particulate material, other droplets, or volatile material for the purpose of imparting special desired characteristics to the product may be adjusted to provide an almost infinite variety of operating conditions. For these reasons careful attention to control of variables is essential. The aerosol formed may be considered to be a blended aerosol of controlled characteristics.

Through use of the blended aerosol concept of operating the spray freeze it is possible to prepare great varieties of mixtures which may impart new properties to the products. The potential advantages of mixing dissimilar droplets in an aerosol and of allowing the droplets to equilibrate in the aerosol with volatile constituents are numerous. Particles mixed as droplets or partly dried particles may be compatible whereas the ingredients contained in the two or more kinds of droplets would not be compatible in the same suspension. Volatile substances in contact with particles will dissolve in or react with the particles in a way which may differ from the manner in which the same substance would react with the suspension before aerosolization.

Because of the feature of the invention which permits formulation of mixtures of particles of varying composition and size it would be possible to prepare solid powders, which are stable chemicals when stored but which are highly reactive when exposed to air, water, or other suitable environmental conditions. Since particles can be controlled in composition and particle size, it is possible to control the rates of delayed reactions to conform to special needs, or to bring about reactions between combinations of precursors contained in a mixture of dissimilar particles. The controlled sequential release of constituent of intimately mixed powders could enable combinations and reactions not otherwise possible.

In the biological application the ability to formulate uniform mixtures of dissimilar powders permits preparation of biological products consisting of individual living organisms or viruses in intimate combination with preservative substances or other ingredients. Such mixtures may be used to bring about occurrences such as the advent of disease through infection, through the enhanced ability to invade normally resistant tissue. Conversely the method might be utilized to bring about mass immunization which would not occur unless the chemical adjuvant and the biological ingredients were applied together. This method also permits the formulation of single preparations of biological warfare agents and co-agents which could not exist compatibly in the liquid form or which could not be formulated into solid particulates by conventional procedures, such as freeze drying and subsequent grinding to reduce particle size.

Subsequent to formulation, the blended aerosol is provided with fluid flow, electrical, or other energy to give the particles sufficient velocity to cause them to be impinged upon a cooled surface where they become immobilized by entrapment in a concurrently forming bed of the condensible constituents of the aerosol. Because the procedure has resulted in the reduction of the droplets to essentially rigid particles of solid material the particulates retain their approximately spherical form and their individual identity as they impinge upon the bed of condensing gases and are immobilized. Because the condensible gases are being deposited continuously each particle is separated from the others by a thin layer of condensed gases. Particles as small as one half micron in diameter can be processed using a device which depends solely upon the pressure of moving gases to cause impingement of particles upon the cold collecting surface. Below one half micron it is necessary to employ additional means to secure impingement of the particulates in the bed of condensible gases. Particles as small as 0.2 micron may be collected on a cold surface that is charged opposite to the particles contained in the aerosol.

After collection of the condensed gases and particulate matter the mixture is scraped off the cooled surface into a cold storage container. The essential feature of this step is maintenance of the temperature low enough to prevent any migration of liquid from the frozen mass into or around the frozen particles. At any time after collection of the aerosol the final step of the process, namely freeze drying to remove all remaining free water from the product, may be accomplished.

I claim:

1. Method of drying biological suspensions to a dispersible aerosol form which comprises aerosolizing the biological suspension, partially surface drying the aerosol droplets to form particles, subsequently impinging the aerosol particles onto a cold collecting surface, thereby encompassing each of the particles in a layer of pure water ice, removing the frozen aerosol particles from the cold surface and freeze drying under vacuum.

2. A method in accordance with claim 1 wherein the aerosol is combined with vapors of volatile condensible substances.

3. A method in accordance with claim 1 wherein the aerosol particles are made to impinge on the cold surface by utilizing a pressure differential.

4. A method in accordance with claim 1 wherein the aerosol particles are made to impinge on the cold surface by utilizing an electrical charge.

5. A method in accordance with claim 1 wherein the aerosol particles are made to impinge on the cold surface by utilizing a temperature differential in the system.

References Cited by the Examiner

UNITED STATES PATENTS

| 2,897,600 | 8/1959 | Graham et al. | 34—5 |
| 3,152,453 | 10/1964 | Hamilton | 62—346 X |

FOREIGN PATENTS

| 1,052,062 | 5/1959 | Germany. |

WILLIAM J. WYE, *Primary Examiner,*

REUBEN EPSTEIN, *Examiner.*